F. M. HOLMES.
STORAGE BATTERY.
APPLICATION FILED AUG. 12, 1912.

1,116,818.

Patented Nov. 10, 1914.

WITNESSES:
Geo. B. Phillips.
Jas. B. Delaney

INVENTOR
Frank M. Holmes

UNITED STATES PATENT OFFICE.

FRANK M. HOLMES, OF SPRINGFIELD, MISSOURI, ASSIGNOR TO L. W. THORP, OF SPRINGFIELD, MISSOURI.

STORAGE BATTERY.

1,116,818. Specification of Letters Patent. Patented Nov. 10, 1914.

Application filed August 12, 1912. Serial No. 714,598.

*To all whom it may concern:*

Be it known that I, FRANK M. HOLMES, a citizen of the United States of America, residing at Springfield, in the county of Greene and State of Missouri, have invented certain new and useful Improvements in Storage Batteries, of which the following is a specification, reference being had therein to the accompanying drawing.

This invention relates to storage batteries and has for its object the production of a simple and efficient battery which is composed of the minimum number of parts which is so arranged for the purpose of allowing the same to be charged at a very high rate.

A further object of this invention is the production of a simple and efficient battery which possesses the minimum amount of internal and external resistance.

With the above and other objects in view this invention consists of certain novel combinations, constructions and arrangements of parts as will be hereinafter fully described and claimed.

Figure 1:
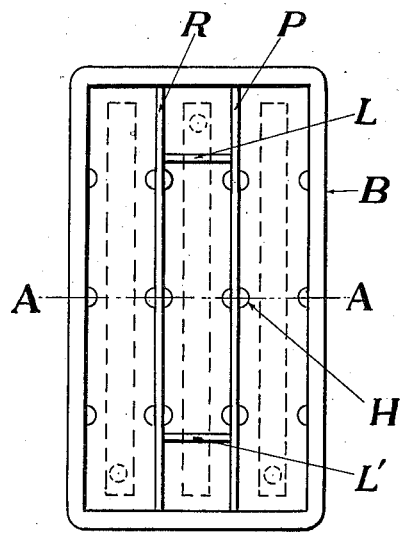
Figure 2:
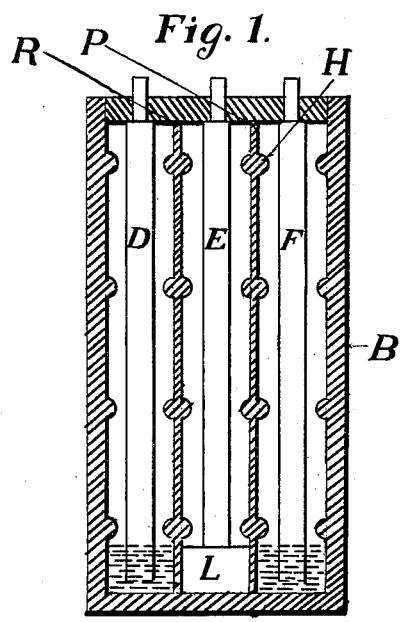
Figure 3:
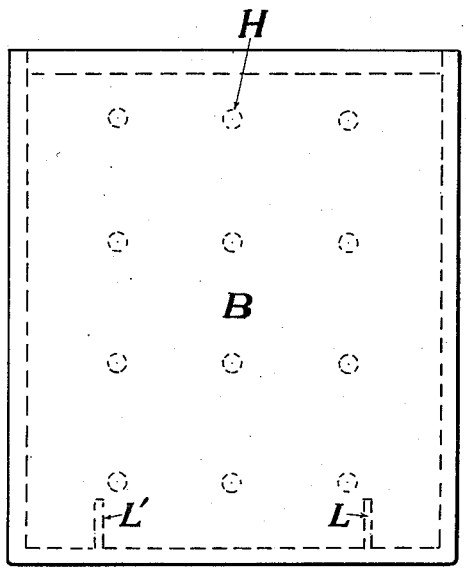

In the accompanying drawings:—Figure 1 is a top plan view of the battery. Fig. 2 is a central section of the battery taken on the line A—A of Fig. 1. Fig. 3 is a side elevation of the battery.

By referring to the drawings it will be seen that B designates the outer receptacle of the battery which is preferably formed of rubber to constitute an insulated covering therefor. This rubber casing B is formed of sufficient thickness to lend sufficient strength for allowing the receptacle B to retain its normal shape under ordinary circumstances. This receptacle B is divided into three equal compartments or cells, the middle compartment being provided at the bottom thereof with two transversely extending ribs L and L' approximately one-eighth the height of the casing B for the purpose of supporting the leaden plate E which is carried in the central compartment or cell. The partition walls R and P which divide the compartments as clearly illustrated in Figs. 1 and 2 are perforated within about one-eighth of their length from the bottom of the receptacle to allow the liquid contained within the battery to have a free circulation therethrough. The partitions R and P are provided upon each of the faces thereof with knobs H for the purpose of holding the several electrodes out of contact with the faces of the walls of the partitions. The inner face of the receptacle B is also provided with a plurality of these knobs H for the purpose of holding the electrodes away from the walls, and in this manner allowing a free circulation of the electrolyte throughout the battery.

The leaden plate E above mentioned constitutes the positive element of the battery and is formed of lead and lead-oxid. This plate E is placed within the central compartment of the battery, and within the two outer compartments of the battery the negative plates D are placed, which negative plates are formed of zinc and mercury. The inner receptacle B is filled or partially filled to the desired height with a solution of C. P. sulfuric acid which constitutes an electrolyte.

The mercury and zinc plates which constitute the negative element are amalgamated with mercury and placed in the outside cells, the plates being so placed that their lower ends are immersed in the mercury placed in the bottom of the cell.

From the foregoing description it will be seen that in view of the fact that the partitions R and P are perforated the sulfuric acid and water which constitute the electrolyte will readily circulate throughout the battery, and in this manner allow the positive and negative elements to readily coöperate for the purpose of generating an electric current.

Of course, if it be so desired the battery or casing B may be provided with a cover as is illustrated in Fig. 2.

Having thus described the invention what is claimed as new, is:—

1. A storage battery comprising an insulating receptacle, said receptacle provided with a plurality of knobs upon the inner face thereof, a plurality of perforated integral partitions formed within said receptacle for dividing said receptacle into a plurality of compartments, the central compartment of said receptacle provided with a plurality of upwardly extending rib portions, a positive element placed upon said rib portions, a plurality of negative elements placed upon opposite sides of said positive element and within the outer compartment, and an electrolyte placed within said receptacle.

2. A storage battery comprising a non-conducting rubber receptacle provided with a pair of upwardly extending partitions, a plurality of knobs formed upon the inner and outer faces thereof, a plurality of knobs formed upon the inner face of said receptacle, said partitions dividing said receptacle into a plurality of compartments, a plurality of supporting ribs placed within the central compartment, a positive element placed upon said ribs whereby said positive element may be supported above the lower edge of said receptacle, the outer compartment of said receptacle provided with volatile metal in the bottom thereof below the upper edge of said rib portions of said central partition, negative elements placed within said outer compartment having their lower ends immersed within said volatile metal, said partitions bieng perforated, and electrolyte placed within said receptacle.

3. A storage battery comprising an insulated rubber receptacle provided with a pair of upwardly extending partitions, a plurality of knobs formed upon the inner and outer faces thereof, a plurality of knobs formed upon the inner face of said receptacle, said partitions dividing said receptacle into a plurality of compartments, a plurality of supporting ribs placed within the central compartment, a positive element placed upon said ribs whereby said positive element may be supported above the lower edge of said receptacle, the outer compartment of said receptacle provided with volatile metal in the bottom thereof below the upper edge of said rib portions of said central partition, negative elements placed within said outer compartment having their lower ends immersed within said volatile metal, said partitions being perforated, and an electrolyte placed within said receptacle.

FRANK M. HOLMES.

Witnesses:
 GEO. B. PHILLIPS,
 JAS. B. DELANEY.